Patented Jan. 16, 1945

2,367,275

UNITED STATES PATENT OFFICE 2,367,275

PROCESS FOR THE PRODUCTION OF INSULATION MATERIALS

Clifford I. Haney and Mervin E. Martin, Cumberland, Md., assignors to Celanese Corporation of America, a corporation of Delaware No Drawing. Application April 23, 1942, Serial No. 440,208

4 Claims. (Cl. 18—55)

This invention relates to the production of insulation material, and relates more particularly to the production of insulation material from cellular materials having a basis of a derivative of cellulose.

An object of our invention is the production of heat insulation material having a low thermal conductivity value from cellular material having a basis of a derivative of cellulose, and especially cellulose acetate.

Another object of our invention is the production of heat insulation material of low density which may be easily fabricated to any shape.

Still another object of our invention is the production of heat insulation material which is relatively inexpensive and highly resistant to the action of organisms such as fungi and bacteria.

Other objects of our invention will appear from the following detailed description.

Materials having a cellular structure have long been employed for insulation purposes. The material of this type most commonly employed has been cork, which has usually been employed in the form of boards of varying thicknesses. The cork board is prepared by compressing particles of finely divided cork, with or without some binding material, under sufficient pressure to cause the particles to adhere. In place of cork, it has been proposed to prepare insulating materials from other materials of a cellular structure, such as, for example, those having a basis of a derivative of cellulose.

Such cellular materials have been prepared in several ways. According to one method, the derivative of cellulose is dissolved in a solvent to produce a viscous solution and there is incorporated therein a solid which is capable of being decomposed by heat or chemical treatment to yield a gas. After the solution has been set, or substantially set, the mass is then treated so as to decompose the gas-generating solid and the generation of the gas therefrom causes the formation of hollow spaces throughout the mass, resulting in a porous or cellular structure. The disadvantage of this process is that the pore size is variable and irregular, and there is difficulty in ensuring that all of gas-generating solid is decomposed. The decomposition products of the solids incorporated therein to form the pores must also be completely removed, at times quite difficult. Unless complete decomposition and complete removal of decomposition products are effected the porous mass is not satisfactory for many purposes. In accordance with another prior method, a solution of a derivative of cellulose in a volatile solvent is prepared and soluble inorganic salts of appreciable particle size are mixed therewith. After the solution has been suitably shaped and then set by removal of the solvent, the soluble salts are extracted with water from the body of the shaped cellulose derivative leaving behind a cellular mass or structure. The disadvantage of this process is that repeated extractions are necessary in order to remove the salts, and their complete removal is a lengthy and costly operation. In addition, the resulting cellular structure is also unsatisfactory for many purposes.

By yet another method, whereby the aforementioned disadvantages have been overcome, as more particularly pointed out and claimed in our co-pending application S. No. 390,542, filed May 28, 1941, there is added to the derivative of cellulose in finely divided form a volatile liquid or mixture of liquids having, in the vapor state, at least a solvent, swelling or softening action thereon, and the mixture is subjected to the action of elevated temperature and pressure in a closed chamber. Examples of the liquids or liquid mixtures which may be employed are acetone, ethyl alcohol, ethyl alcohol and benzol, water, chloroform, ethylene dichloride, acetone and ethyl or methyl alcohol, ethylene dichloride and ethyl or methyl alcohol, methyl chloride and ethyl or methyl alcohol, butanol, diacetone alcohol, and gasoline hydrocarbons, as well as mixtures of organic liquids with various amounts of water. While all these liquids are suitable, acetone, butanol, ethyl alcohol, and mixtures of these liquids with water or benzol, are preferably employed. The conditions of elevated temperature and pressure are maintained until the cellulose derivative is at least partially converted and the pressure is then suddenly released. The sudden release of the pressure while the treated material is at an elevated temperature allows the liquid absorbed therein to vaporize with extreme rapidity and the cellulose derivative is expanded to a strong, firm, cellular material of low density and even texture suitable for many purposes. Among the uses suggested in said co-pending application is the employment of this expanded material for thermal insulating purposes.

While materials having the characteristics of cork board have been prepared from this derivative of cellulose material after it has been reduced to a comminuted form, it has been observed that the pressure to which the finely divided material must be subjected during the forming operation tends to destroy the advantageous cellular character of the material. In addition, the presence of certain binding agents, which it has been found necessary to employ, raises the heat transfer coefficient of the material undesirably and this factor, combined with the partial destruction of the cellular character, substantially reduces its thermal efficiency.

We have now discovered that insulating material of high thermal efficiency may be prepared from expanded cellular material having a basis of a derivative of cellulose and prepared particularly in accordance with the process described in our co-pending application S. No. 390,542. In accordance with our present invention, discrete particles of fairly substantial dimensions of said expanded cellular material, are joined under carefully controlled conditions of temperature and pressure to form a unitary mass by means of a binding agent which is in a partially polymerized condition before application. The action of the pressure molds the particles of the expanded cellular material into the shape desired, and the action of the heat causes the binding agent to undergo further polymerization, the polymerized binding agent holding together the particles of cellulose material. The product obtained by our novel process is a thermal insulating material of very low density. The product can be cut, sawed, nailed, etc., and possesses a thermal insulating efficiency, as indicated by its heat transfer coefficient, greater than that of cork.

As indicated, the temperatures and pressures employed in the production of our thermal insulating material must be carefully controlled so that a product having the advantageous properties indicated will be obtained. The pressures must be chosen so that the cellular character of the material will not be impaired or destroyed, while the temperatures employed must be sufficiently high to insure rapid polymerization of the binding agent without causing excessive shrinkage of the expanded material due to the increased pressure and the effect of increased thermoplasticity at elevated temperatures. We have found that pressures of from 1 to 5 pounds per square inch and temperatures of from 115 to 140° C. are satisfactory. Preferably, with a binding agent such as a partially polymerized phenol-formaldehyde resin we employ a temperature of about 140° C. and a pressure of about 1 pound per square inch. Under these conditions, the most rapid polymerization is obtained while shrinkage is held to a minimum. Satisfactory adhesion may be obtained in from ½ to 2 hours depending upon the binding agent employed.

The size of the discrete particles employed in the production of insulating material in accordance with our invention has a definite bearing on the properties of the final product. If the particle size too closely approaches the size of the individual cells present in the structure, the cellular character will largely be destroyed and the effect of temperature and pressure will cause the product to be rather solid in character rather than cellular, since the material being subjected to treatment will be more in the nature of a powder substantially devoid of cells. For this reason the average particle size should be at least larger than the average size of the cells so that the cellular nature of the material may be retained. The size of the particles, may of course, be considerably larger than this, the maximum size being limited only by the degree of cohesion desired in the final product. The smaller the particle size, the greater will be the degree of cohesion since smaller particles are in contact over a greater proportion of their area than are larger particles. Generally, particles having an average maximum dimension of from 0.1 to 0.7 inch, and preferably about 0.4 inch, are satisfactory.

Various partially polymerized compounds may be employed as binding agents in the production of our novel insulation material. Polymers obtained by the partial polymerization of vinyl esters, vinyl halides, mixtures of vinyl esters and vinyl halides, and partially polymerized indene resins, styrene resins urea-aldehyde resins, and the like, are suitable. Preferably, we employ a partially polymerized phenol-aldehyde resin such as that obtained by the reaction of phenol and formaldehyde in the presence of sulfuric acid as catalyst. The binding agent is most advantageously applied dissolved in a suitable volatile solvent such as, for example, acetone, diethyl ether, ethyl acetate, carbon tetrachloride, ethyl alcohol, or methyl alcohol. The solution is mixed with the particles of cellular material, and under the influence of heat, the volatile solvent evaporates and polymerization is completed in situ causing a firm adhesion of the particles.

The insulating material may be formed in any convenient manner. For insulating material in the form of board, a thin layer of the mix may be shaped between broad, flat molding surfaces, while for insulating material of other shapes, suitably shaped molds may be employed. The mix may also be extruded in the desired shape through suitably shaped orifices by means of a screw stuffer, or the like, and heat may be applied to the shaped product during and/or after extrusion to complete polymerization of the resin.

In order further to illustrate our invention but without being limited thereto the following examples are given:

*Example I*

Cellulose acetate having an acetyl value of 54.4%, calculated as acetic acid, is ground to pass a 40 mesh screen and butanol is sprayed on to the particles. The particles are tumbled for about 2 hours in a closed chamber to distribute the butanol evenly and 10% by weight of butanol is retained by the particles. The treated cellulose acetate is placed in a mold heated to 200° C. and subjected to a pressure of 2,500 pounds per square inch. The heated cellulose acetate is maintained under this pressure for 2 minutes and the pressure is suddenly released allowing the material to expand into atmospheric pressure. A solid cellular material results.

A partially polymerized binding agent having a basis of a phenol-formaldehyde resin is prepared in the following manner: 2 parts by weight of 40% formalin solution containing 1% of its weight of sulfuric acid to act as a catalyst is mixed with 1 part by weight of phenol. The mixture is heated to boiling under reflux and when the boiling point is reached the heat source is removed and the reaction mixture continues to boil due to the exothermic nature of the reaction. After about 3 to 4 minutes, the polymer which forms becomes insoluble in the solution and separates. Polymerization ceases. Sodium carbonates is added to neutralize the sulfuric acid and the resin is stirred until foaming ceases. The resin is washed with several changes of water and then separated from the last wash. The resulting resin is soluble in acetone and diethyl ether. A 25% solution of the resin in diethyl ether is prepared as the binding agent.

28 parts by weight of expanded cellular cellulose acetate material, prepared as described, is cut into cubes of approximately 0.4 inch on a side, and mixed with 5 parts by weight of partially polymerized phenol-formaldehyde resin, in the form of a 25% solution in diethyl ether. After thorough mixing to distribute the resin evenly, the mix is placed in a tubular mold having a diameter of 6 inches and heated to 150° C. The mix is maintained under a pressure of 1 pound per square inch and at a temperature of 150° C. for one hour, during which time the polymerization of the resin binder is completed and the particles adhere firmly to each other.

The density of the material is 0.083 and the specific thermal conductivity is 0.22 B. t. u./hr./sq. ft./°F./inch, a value exceeding the insulating properties of cork board.

Example II 60 parts by weight of expanded cellular cellulose acetate material, prepared as in Example I, and cut into cubes of about 0.4 inch on a side are mixed with 6 parts by weight of partially polymerized phenol-formaldehyde resin in the form of a 25% solution in diethyl ether. The mixture is well stirred as the ether evaporates so that the resin is uniformly distributed over the cellular particles. The mix is placed in a mold held at 140° C. and maintained at this temperature for one hour under a pressure of 1 pound per square inch. The resulting cake has a density of 0.086 and may be cut with ease on a band saw. The specific thermal conductivity is 0.189 B. t. u./hr./sq. ft./°F./inch, a remarkably low value.

While our invention has been more particularly described in connection with the use of cellulose acetate in the preparation of our novel insulating material, other cellulose esters as well as ethers may also be employed. Examples of other cellulose esters are cellulose propionate and cellulose butyrate, mixed esters such as cellulose acetate-priopionate and cellulose acetate-butyrate, inorganic esters such as cellulose nitrate, preferably of low nitrogen content, while examples of cellulose ethers are ethyl cellulose and benzyl cellulose. Where cellulose acetate is employed it may have an acetyl value of 40% to 62.5% (determined as acetic acid).

In order to increase the strength or to modify the appearance or properties of the objects being molded or extruded, fibrous or other fillers may be incorporated therein. Examples of such fibrous fillers are fibers of cotton, flax, hemp, ramie, jute and natural silk, while examples of other filling materials are cork, sawdust, wood shavings, clay, asbestos, etc., or mixtures of these. In addition, pigments may be incorporated in the material or the material may be dyed to obtain color effects. The cellulose derivatives may be treated with suitable plasticizers before they are expanded. Any suitable plasticizer may be employed such as, for example, dimethyl phthalate, diethyl phthalate, dibutyl tartrate, triphenyl phosphate, tricresyl phosphate, dibutyl phthalate and mono-ethyl-p-toluene sulfonamide.

It is to be understood that the foregoing detailed description is merely given by way of illustration and that many variations may be made therein without departing from the spirit of our invention.

Having described our invention, what we desire to secure by Letters Patent is:

1. Process for the production of insulating materials which comprises associating discrete particles having an average maximum dimension of 0.1 to 0.7" of a low density cellular material having a basis of a derivative of cellulose, selected from the group consisting of cellulose esters and cellulose ethers, with a partially polymerized resin, and subjecting said treated particles to the action of a temperature of from 115 to 140° C. and a pressure of from 1 to 5 pounds per square inch so as to cause said resin to undergo further polymerization in situ and bind said discrete particles into a firm, coherent mass.

2. Process for the production of insulating materials which comprises associating discrete particles having an average maximum dimension of 0.1 to 0.7" of a low density cellular material having a basis of a derivative of cellulose, selected from the group consisting of cellulose esters and cellulose ethers, with a partially polymerized phenol-formaldehyde resin, and subjecting said treated particles to the action of a temperature of from 115 to 140° C. and a pressure of from 1 to 5 pounds per square inch so as to cause said resin to undergo further polymerization in situ and bind said discrete particles into a firm, coherent mass.

3. Process for the production of insulating materials, which comprises associating discrete particles having an average maximum dimension of 0.1 to 0.7" of a low density cellular material having a basis of cellulose acetate with a partially polymerized resin, and subjecting said treated particles to the action of a temperature of from 115 to 140° C. and a pressure of from 1 to 5 pounds per square inch so as to cause said resin to undergo further polymerization in situ and bind said discrete particles into a firm, coherent mass.

4. Process for the production of insulating materials, which comprises associating discrete particles having an average maximum dimension of 0.1 to 0.7 inch of a low density cellular material having a basis of cellulose acetate with a partially polymerized phenol-formaldehyde resin, and subjecting said treated particles to the action of a temperature of from 115 to 140° C. and a pressure of from 1 to 5 pounds per square inch so as to cause said resin to undergo further polymerization in situ and bind said discrete particles into a firm, coherent mass.

CLIFFORD I. HANEY.
MERVIN E. MARTIN.